(12) United States Patent
Yin et al.

(10) Patent No.: US 11,189,034 B1
(45) Date of Patent: Nov. 30, 2021

(54) SEMANTIC SEGMENTATION METHOD AND SYSTEM FOR HIGH-RESOLUTION REMOTE SENSING IMAGE BASED ON RANDOM BLOCKS

(71) Applicant: ZHEJIANG UNIVERSITY, Hangzhou (CN)

(72) Inventors: Jianwei Yin, Hangzhou (CN); Ge Su, Hangzhou (CN); Yongheng Shang, Hangzhou (CN); Zhengwei Shen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/012,811

(22) Filed: Sep. 4, 2020

(30) Foreign Application Priority Data

Jul. 22, 2020 (CN) .......................... 202010708331.6

(51) Int. Cl.
  *G06T 7/143* (2017.01)
  *G06T 7/11* (2017.01)
  *G06F 17/18* (2006.01)

(52) U.S. Cl.
  CPC .............. *G06T 7/143* (2017.01); *G06F 17/18* (2013.01); *G06T 7/11* (2017.01); *G06T 2207/20081* (2013.01); *G06T 2207/20084* (2013.01); *G06T 2207/20132* (2013.01)

(58) Field of Classification Search
  CPC . G06T 2207/20132; G06T 2207/20084; G06T 2207/20081; G06T 7/11; G06T 7/143; G06F 17/18
  See application file for complete search history.

(56) References Cited

U.S. PATENT DOCUMENTS 10,067,509 B1 * 9/2018 Wang ........................ G06K 9/66
10,147,193 B2 * 12/2018 Huang .................. B60W 30/10
10,452,947 B1 * 10/2019 Ahmed ................ G06K 9/4628
(Continued)

OTHER PUBLICATIONS

Aytaylan et al. "Semantic Segmentation of Hyperspectral Images with the Fusion of Lidar Data;" IEEE 2016 IGARSS pp. 1-4.*
(Continued)

*Primary Examiner* — Mia M Thomas
(74) *Attorney, Agent, or Firm* — Myers Wolin, LLC (57) ABSTRACT

A semantic segmentation method and system for a high-resolution remote sensing image based on random blocks. In the semantic segmentation method, the high-resolution remote sensing image is divided into random blocks, and semantic segmentation is performed for each individual random block separately, thus avoiding overflow of GPU memory during semantic segmentation of the high-resolution remote sensing image. In addition, feature data in random blocks neighboring each random block incorporated into the process of semantic segmentation, overcoming the technical shortcoming that the existing segmentation method for the remote sensing image weakens the correlation within the image. Moreover, in the semantic segmentation method, semantic segmentation is separately performed on mono-spectral feature data in each band of the high-resolution remote sensing image, thus enhancing the accuracy of sematic segmentation of the high-resolution remote sensing image.

10 Claims, 2 Drawing Sheets

(56) References Cited

U.S. PATENT DOCUMENTS

| | | | | |
|---|---|---|---|---|
| 10,671,083 | B2* | 6/2020 | Zhu | G01S 17/42 |
| 10,671,873 | B2* | 6/2020 | Wang | G06K 9/3241 |
| 10,984,225 | B1* | 4/2021 | Ghosh | G06K 9/6211 |
| 2013/0163829 | A1* | 6/2013 | Kim | G06K 9/00 382/118 |
| 2015/0140522 | A1* | 5/2015 | Bose | G09B 21/007 434/113 |
| 2015/0268058 | A1* | 9/2015 | Samarasekera | G08G 5/0073 701/409 |
| 2017/0200260 | A1* | 7/2017 | Bhaskar | G06T 7/0004 |
| 2018/0218497 | A1* | 8/2018 | Golden | G06T 7/11 |
| 2019/0236342 | A1* | 8/2019 | Madden | G08B 13/19602 |
| 2019/0304098 | A1* | 10/2019 | Chen | G06K 9/627 |
| 2019/0347498 | A1* | 11/2019 | Herman | G06T 7/11 |
| 2019/0355103 | A1* | 11/2019 | Baek | G06T 5/005 |
| 2019/0384963 | A1* | 12/2019 | Kim | G06T 7/248 |
| 2020/0005074 | A1* | 1/2020 | Wang | G06K 9/6257 |
| 2020/0026928 | A1* | 1/2020 | Rhodes | G06K 9/6262 |
| 2020/0117906 | A1* | 4/2020 | Lee | G06K 9/00758 |
| 2020/0151497 | A1* | 5/2020 | Kojima | G06K 9/4652 |
| 2020/0218961 | A1* | 7/2020 | Kanazawa | G06T 5/002 |
| 2020/0327309 | A1* | 10/2020 | Cheng | G06N 3/0445 |
| 2020/0349711 | A1* | 11/2020 | Duke | G06N 3/08 |
| 2021/0073959 | A1* | 3/2021 | Elmalem | G06N 3/0454 |
| 2021/0118112 | A1* | 4/2021 | Huang | G06K 9/62 |

OTHER PUBLICATIONS

Huang et al. "Weakly-supervised Semantic Segmentation in Cityscape via Hyperspectral Image" Computer Vision and Pattern Recognition (cs.CV) Dec. 18, 2020.*

Lin et al. "RefineNet: Multi-Path Refinement Networks for High-Resolution Semantic Segmentation" 2017 IEEE Conference on Computer Vision and Pattern Recognition (CVPR); Year: 2017, vol. 1, pp. 5168-5177.*

Zhao et al. "ICNetfor Real-Time Semantic Segmentation on High-Resolution Images" European Conference on Computer Vision ECCV 2018: Computer Vision—ECCV 2018 pp. 418-434.*

* cited by examiner

SEMANTIC SEGMENTATION METHOD AND SYSTEM FOR HIGH-RESOLUTION REMOTE SENSING IMAGE BASED ON RANDOM BLOCKS

CROSS REFERENCE TO RELATED APPLICATION

This application is a U.S. patent application, which claims priority to Chinese Patent Application No. 202010708331.6, filed on Jul. 22, 2020, the contents of which are herein incorporated by reference.

TECHNICAL FIELD

The present disclosure relates to the field of image processing technologies, and in particular, to a semantic segmentation method and system for a high-resolution remote sensing image based on random blocks.

BACKGROUND

Semantic segmentation is one of the hottest topics in the field of computer vision at present, which aims to classify each pixel of an image as a predefined category. Various semantic segmentation models for different tasks have been proposed in succession and attained remarkable results. Likewise, in the field of high-resolution remote sensing, semantic segmentation also plays an important role in remote sensing images. For example, the proportion of water resources in the ecosystem is monitored in real time by detecting the water resources such as rivers, lakes, and glaciers; and urban development degree is assessed by detecting the distribution of city lights, providing guidance for further development of the city.

In the past ten years, increasingly more high-resolution remote sensing satellites have been launched into space, and have fed back numerous high-resolution remote sensing images incessantly. These remote sensing images are cheap to acquire and rich in content, and further can be dynamically updated. However, different from conventional computer images, these high-resolution remote sensing images are multispectral, and different ranges of spectrums show different sensitivities to corresponding ground objects in the image. Therefore, the high-resolution remote sensing images can be used for detailed detection of objects.

At present, semantic segmentation models for the remote sensing images are constructed basically based on conventional image semantic segmentation networks, among which a Full Convolution Network (FCN) is mainly used. In these means, an image with the random size can be input into the FCN, and is reduced by half in size after going through a convolutional layer and a pooling layer until the image is reduced to the minimum size, to generate a heat map. Finally, the size of the image is restored by means of upsampling, and a pixel-level probability plot is the output to achieve the purpose of predicting each pixel. The well-known U-Net network is improved from such a framework (namely, the FCN). However, it is not difficult to find that although having made great progress in the task of semantic segmentation for common images, the semantic segmentation network is unsatisfactory in processing the multispectral remote sensing images with a large data amount. Common high-resolution remote sensing images have a huge data amount compared to the common images, and usually a single remote sensing image can be gigabyte-sized. If such an image is directly applied in an existing network, overflow of GPU memory is likely to occur. On the other hand, if remote sensing images are directly segmented into blocks, the correlation within the image will lose. Moreover, because the high-resolution remote sensing images are taken from long distances in the sky, the existing network often fails to identify specific categories of ground objects with the same colors, for example, grasslands and forests. How to overcome the technical shortcoming that the existing semantic segmentation method for the high-resolution remote sensing image causes the overflow of GPU memory and is unable to identify objects with the same or similar colors becomes a technical problem, so as to improve the accuracy of semantic segmentation of the high-resolution remote sensing image.

SUMMARY

The objective of the present disclosure is to provide a semantic segmentation method and system for a high-resolution remote sensing image based on random blocks, so as to overcome the technical shortcoming that the existing semantic segmentation method for the high-resolution remote sensing image causes the overflow of GPU memory and is unable to identify objects with the same or similar colors, thus improving the accuracy of semantic segmentation of the high-resolution remote sensing image.

To achieve the above purpose, the present disclosure provides the following technical solutions.

A semantic segmentation method for a high-resolution remote sensing image based on random blocks includes:

partitioning a high-resolution remote sensing image into a plurality of random blocks;

extracting mono-spectral feature data in each band from each random block;

performing semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block; and fusing mono-spectral semantic segmentation probability plots regarding all bands of each random block by using a trained weight, to obtain a fused semantic segmentation probability plot of each random block.

Optionally, the partitioning the high-resolution remote sensing image into random blocks, to obtain a plurality of random blocks specifically includes:

randomly selecting a pixel point do in a central area of the high-resolution remote sensing image;

cropping a square from the high-resolution remote sensing image to obtain a random block $p_0$, where the square is centered at the pixel point $d_0$ and has a randomly generated side length of $len(p_0)$;

further cropping squares which are respectively centered at the four vertices $d_{o1}$, $d_{o2}$, $d_{o3}$, and $d_{o4}$ of the random block $p_0$ and have randomly generated side lengths $len(p_{o1})$, $len(p_{o2})$, $len(p_{o3})$, $len(p_{o4})$ from the high-resolution remote sensing image, to generate random blocks $p_{o1}$, $p_{o2}$, $p_{o3}$ and $p_{o4}$ which neighbor the random block $p_0$, where the side length of each square is in a range of $512 \leq len(\cdot) \leq 1024$; and repeating the step of "further cropping squares which are respectively centered at the four vertices $d_{o1}$, $d_{o2}$, $d_{o3}$ and $d_{o4}$ of the random block $p_0$ and have randomly generated side lengths $len(p_{o1})$, $len(p_{o2})$, $len(p_{o3})$, $len(p_{o4})$ from the high-resolution remote sensing image, to generate random blocks $p_{o1}$, $p_{o2}$, $p_{o3}$, and $p_{o4}$ which neighbor the random block $p_0$", to continuously generate random blocks neighboring each newly generated random block until these newly generated random blocks all reach edges of the high-resolution remote sensing image.

Optionally, the supervised semantic segmentation network includes an encoder, an RNN network, a decoder, a first supervision module, a second supervision module, and a third supervision module;

the encoder, the RNN network, and the decoder are successively connected; and the first supervision module is arranged in the last layer of the encoder, the second supervision module is arranged in the first layer of the decoder, and the third supervision module is arranged in the second layer of the decoder.

Optionally, the performing semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block specifically includes:

extracting abstract features from mono-spectral feature data in the jth bands of the ith random block $p_i$ and a random block $p_{im}$ neighboring the ith random block $p_i$ by using the encoder and according to a formula $$F_i^j = En(P_i^j)$$

$$F_{im}^j = En(P_{im}^j), m = 1, 2, 3, 4,$$

to obtain abstract feature maps regarding the jth bands of the ith random block $p_i$ and the random block $p_{im}$ neighboring the ith random block $p_i$, where $F_i^j$ denotes an abstract feature map regarding the jth band of the random block $p_i$, $En(\square)$ denotes the encoder, and $F_{im}^j$ denotes an abstract feature map regarding the jth band of the mth random block $p_{im}$ neighboring the random block $p_i$;

based on the abstract feature maps regarding the jth bands of the ith random block $p_i$ and the random block $p_{im}$ neighboring the ith random block $p_i$, establishing neighborhood association between abstract feature maps regarding the jth bands of the ith random block $p_i$ and four random blocks neighboring the ith random block $p_i$ via the RNN network and by using the formula $$h_{F_{im}^j} = \begin{cases} \phi(uF_{im}^j + b), & m = 1 \\ \phi\left(uF_{im}^j + wh_{F_{i(m-1)}^j} + b\right), & m = 2, 3, 4 \end{cases}$$

$$h_{F_i^j} = \phi\left(uF_i^j + wh_{F_{i4}^j} + b\right)$$

$$y_{F_{im}^j} = \sigma\left(Vh_{F_{im}^j} + c\right)$$

$$y_{F_i^j} = \sigma\left(Vh_{F_i^j} + c\right),$$

to obtain abstract features of the jth band of the ith random block $p_i$ after the neighborhood association, where $h_{F_{im}^j}$, $h_{F_{i(m-1)}^j}$, and $h_{F_{i4}^j}$ respectively denote outputs of abstract feature maps $F_{im}^j$ regarding the jth bands of the mth random block $p_{im}$, the (m−1)th random block $p_{i(m-1)}$, and the fourth random block $p_{i4}$ which neighbor the ith random block $p_i$ at the hidden layer in the RNN network; $h_{F_i^j}$ denotes an output of the abstract feature map $F_i^j$ regarding the jth band of the ith random block $p_i$ at the hidden layer in the RNN network; $y_{F_{im}^j}$ abstract features of the jth band of the mth random block $p_{im}$ neighboring the ith random block $p_i$ after the neighborhood association; $y_{F_i^j}$ denotes the abstract features of the jth band of the ith random block $p_i$ after the neighborhood association; $\phi(\cdot)$ denotes a first nonlinear function and $\sigma(\cdot)$ denotes a second nonlinear function; u denotes a first transposed matrix, V denotes a second transposed matrix, and w denotes a third transposed matrix; and b denotes a first bias term and c denotes a second bias term;

decoding, with the decoder and by using a formula $p_i^j = De(y_{F_i^j})$, the abstract features of the jth band of the ith random block that are obtained after the neighborhood association, to obtain a mono-spectral semantic segmentation probability plot $p_i^j$ regarding the jth band of the ith random block $p_i$; and supervising feature data output by the encoder, feature data output by the RNN network, and feature data output by the decoder respectively with the first, second, and third supervision modules.

Optionally, before the fusing mono-spectral semantic segmentation probability plots regarding all bands of each random block by using a trained weight, to obtain a fused semantic segmentation probability plot of each random block, the method further includes:

constructing a weight training network for the plurality of mono-spectral semantic segmentation probability plots, where the weight training network includes a plurality of parallel supervised semantic segmentation networks and a convolution fusion module; and based on the multiple pieces of mono-spectral feature data of the random block, performing weight training on the mono-spectral semantic segmentation probability plot regarding each band by using the weight training network, to obtain a trained weight.

A semantic segmentation system for a high-resolution remote sensing image based on random blocks includes:

an image partitioning module, configured to partition a high-resolution remote sensing image into a plurality of random blocks;

a mono-spectral feature data extraction module, configured to extract mono-spectral feature data in each band from each random block;

a semantic segmentation module, configured to: perform semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block; and a fusion module, configured to fuse mono-spectral semantic segmentation probability plots regarding all bands of each random block by using a trained weight, to obtain a fused semantic segmentation probability plot of each random block.

Optionally, the image partitioning module specifically includes a pixel point selection submodule, configured to randomly select a pixel point $d_0$ in a central area of the high-resolution remote sensing image;

a first image partitioning submodule, configured to crop a square from the high-resolution remote sensing image to obtain a random block $p_0$, where the square is centered at the pixel point $d_0$ and has a randomly generated side length of $len(p_0)$;

a second image partitioning submodule, configured to further crop squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$, where the side length of each square is in a range of $512 \leq len(\cdot) \leq 1024$; and a third image partitioning submodule, configured to repeat the step of "further cropping squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$", to continuously generate random blocks neighboring each newly generated random block until these newly generated random blocks all reach edges of the high-resolution remote sensing image.

Optionally, the supervised semantic segmentation network includes an encoder, an RNN network, a decoder, a first supervision module, a second supervision module, and a third supervision module;

the encoder, the RNN network, and the decoder are successively connected; and the first supervision module is arranged in the last layer of the encoder, the second supervision module is arranged in the first layer of the decoder, and the third supervision module is arranged in the second layer of the decoder.

Optionally, the semantic segmentation module specifically includes:

an encoding submodule, configured to extract abstract features from mono-spectral feature data in the jth bands of the ith random block $p_i$ and a random block $p_{im}$ neighboring the ith random block $p_i$ by using the encoder and according to a formula $$F_i^j = En(P_i^j)$$

$$F_{im}^j = En(P_{im}^j), m = 1, 2, 3, 4,$$

to obtain abstract feature maps regarding the jth bands of the ith random block $p_i$ and the random block $p_{im}$ neighboring the ith random block $p_i$, where $F_i^j$ denotes an abstract feature map regarding the jth band of the random block $p_i$, $En(\square)$ denotes the encoder, and denotes an abstract feature map regarding the jth band of the mth random block $p_{im}$ neighboring the random block $p_i$;

a neighborhood feature association submodule, configured to: based on the abstract feature maps regarding the jth bands of the ith random block $p_i$ and the random block $p_{im}$ neighboring the ith random block $p_i$, establish neighborhood association between abstract feature maps regarding the jth bands of the ith random block $p_i$ and four random blocks neighboring the ith random block $p_i$ via the RNN network and by using the formula $$h_{F_{im}^j} = \begin{cases} \phi(uF_{im}^j + b), & m = 1 \\ \phi\left(uF_{im}^j + wh_{F_{i(m-1)}^j} + b\right), & m = 2, 3, 4 \end{cases}$$

$$h_{F_i^j} = \phi\left(uF_i^j + wh_{F_{i4}^j} + b\right)$$

$$y_{F_{im}^j} = \sigma\left(Vh_{F_{im}^j} + c\right)$$

$$y_{F_i^j} = \sigma\left(Vh_{F_i^j} + c\right),$$

to obtain abstract features of the jth band of the ith random block $p_i$ after the neighborhood association, where $h_{F_{im}^j}$, $h_{F_{i(m-1)}^j}$, and $h_{F_{i4}^j}$ respectively denote outputs of abstract feature maps $F_{im}^j$ regarding the jth bands of the mth random block $p_{im}$, the (m−1)th random block $p_{i(m-1)}$, and the fourth random block $p_{i4}$ which neighbor the ith random block $p_i$ at the hidden layer in the RNN network; $h_{F_i^j}$ denotes an output of the abstract feature map $F_i^j$ regarding the jth band of the ith random block $p_i$ at the hidden layer in the RNN network; $y_{F_{im}^j}$ denotes abstract features of the jth band of the mth random block $p_{im}$, neighboring the ith random block $p_i$ after the neighborhood association; $y_{F_i^j}$ denotes the abstract features of the jth band of the ith random block $p_i$ after the neighborhood association; $\phi(\cdot)$ denotes a first nonlinear function and $\sigma(\cdot)$ denotes a second nonlinear function; u denotes a first transposed matrix, V denotes a second transposed matrix, and w denotes a third transposed matrix; and b denotes a first bias term and c denotes a second bias term;

a decoding submodule, configured to decode, with the decoder and by using a formula $p_i^j = De(y_{F_i^j})$, the abstract features of the jth band of the ith random block that are obtained after the neighborhood association, to obtain a mono-spectral semantic segmentation probability plot $p_i^j$ regarding the jth band of the ith random block $p_i$; and a supervision submodule, configured to supervise feature data output by the encoder, feature data output by the RNN network, and feature data output by the decoder respectively with the first, second, and third supervision modules.

Optionally, the semantic segmentation system for a high-resolution remote sensing image based on random blocks further includes:

a weight training network construction module, configured to construct a weight training network for the plurality of mono-spectral semantic segmentation probability plots, where the weight training network includes a plurality of parallel supervised semantic segmentation networks and a convolution fusion module; and a weight training module, configured to: based on the multiple pieces of mono-spectral feature data of the random block, perform weight training on the mono-spectral semantic segmentation probability plot regarding each band by using the weight training network, to obtain the trained weight.

According to specific embodiments provided by the present disclosure, the present disclosure discloses the following technical effects.

The present disclosure discloses a semantic segmentation method for a high-resolution remote sensing image based on random blocks, where the semantic segmentation method includes: partitioning a high-resolution remote sensing image into a plurality of random blocks; extracting mono-spectral feature data in each band from each random block; performing semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block; and fusing mono-spectral semantic segmentation probability plots regarding all bands of each random block by using a trained weight, to obtain a fused semantic segmentation probability plot of each random block. The present disclosure divides the high-resolution remote sensing image into random blocks, and performs semantic segmentation for each individual random block separately, thus avoiding overflow of GPU memory during semantic segmentation of the high-resolution remote sensing image. In addition, the present disclosure incorporates feature data in random blocks neighboring each random block in the process of semantic segmentation, overcoming the technical shortcoming that the existing segmentation method for the remote sensing image weakens the correlation within the image. Moreover, the present disclosure performs semantic segmentation separately on mono-spectral feature data in each band of the high-resolution remote sensing image, so that objects with the same or similar colors can be accurately identified according to the characteristic that different ground objects have different sensitivities to light with different spectrums, thus enhancing the accuracy of sematic segmentation of the high-resolution remote sensing image.

BRIEF DESCRIPTION OF DRAWINGS

To describe the technical solutions in the embodiments of the present disclosure or in the related art more clearly, the following briefly describes the accompanying drawings required for the embodiments. Apparently, the accompanying drawings in the following description show merely some embodiments of the present disclosure, and those of ordinary skill in the art may still derive other accompanying drawings from these accompanying drawings without creative efforts.

DETAILED DESCRIPTION

Certain embodiments herein provide a semantic segmentation method and system for a high-resolution remote sensing image based on random blocks, so as to overcome the technical shortcoming that the existing semantic segmentation method for the high-resolution remote sensing image causes the overflow of GPU memory and is unable to identify objects with the same or similar colors, thus improving the accuracy of semantic segmentation of the high-resolution remote sensing image.

To make the foregoing objective, features, and advantages of the present disclosure clearer and more comprehensible, the present disclosure is further described in detail below with reference to the accompanying drawings and specific embodiments.

To achieve the above objective, the present disclosure provides the following solutions: Generally, a high-resolution remote sensing image covers a very wide geographic area and has a huge data amount which may be gigabyte-sized. In addition, the high-resolution remote sensing image usually contains four or more spectral bands, among which a blue band from 0.45-0.52 μm, a green band from 0.52-0.60 μm, a red band from 0.62-0.69 μm, and a near-infrared band from 0.76-0.96 μm are the most common spectral bands. However, the exiting semantic segmentation network seldom considers the effects of the different bands on semantic segmentation. In addition, limited by the receptive field, most convolutional neural networks (CNNs) for semantic segmentation can only acquire limited context information, easily resulting in divergence in classification of visually similar pixels. Therefore, certain embodiments herein focus on the effects with different spectrums on semantic segmentation, and employs a recurrent neural network (RNN) to enhance dependency between pixels.

Figure 1:
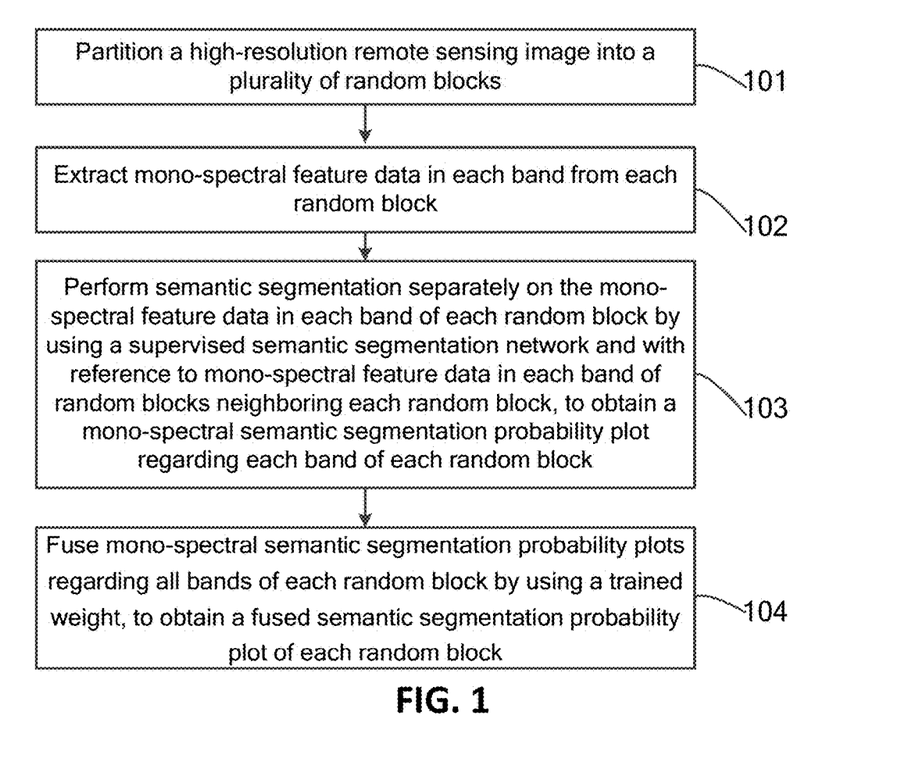
FIG. 1 is a flowchart of a semantic segmentation method for a high-resolution remote sensing image based on random blocks provided by the present disclosure.

As shown in FIG. 1, a semantic segmentation method for a high-resolution remote sensing image based on random blocks, where the semantic segmentation method includes:

Step 101: Partition a high-resolution remote sensing image into a plurality of random blocks.

The step of partitioning a high-resolution remote sensing image into a plurality of random blocks specifically includes: randomly selecting a pixel point $d_0$ in a central area of the high-resolution remote sensing image; cropping a square from the high-resolution remote sensing image to obtain a random block $p_0$, where the square is centered at the pixel point $d_0$ and has a randomly generated side length of $len(p_0)$; further cropping squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$, where the side length of each square is in a range of $512 \leq len(\cdot) \leq 1024$; and repeating the step of "further cropping squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$", to continuously generate random blocks neighboring each newly generated random block until these newly generated random blocks all reach edges of the high-resolution remote sensing image.

Figure 2:
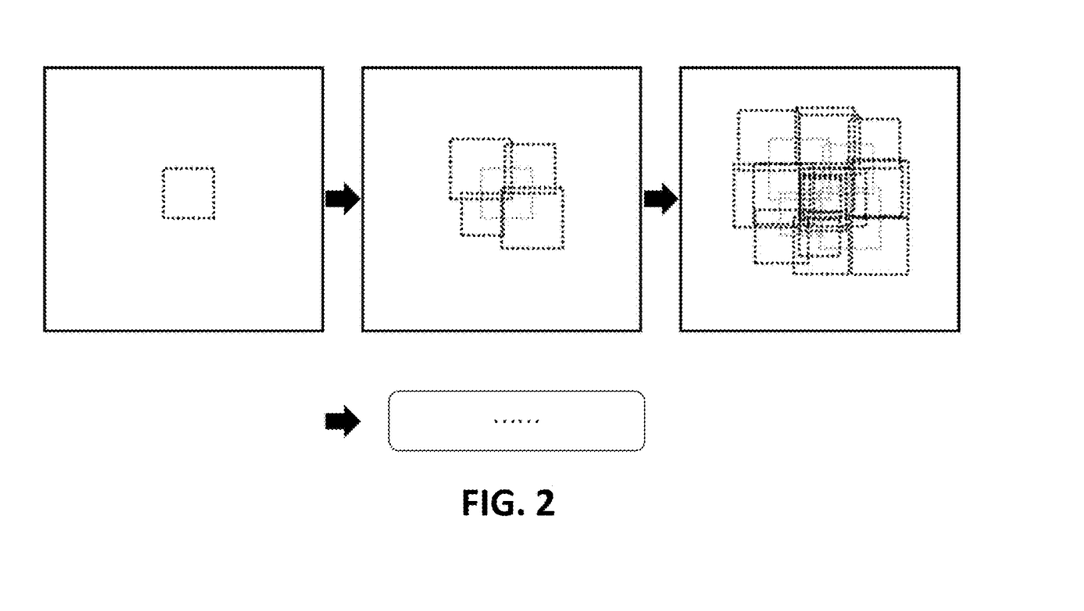
FIG. 2 is a principle diagram of image partitioning into random blocks provided by the present disclosure.

Specifically, as shown in FIG. 2, it is assumed that the height and the width of an input high-resolution remote sensing image $\mathcal{X}$ are respectively $H(\mathcal{X})$ and $\mathcal{W}(\mathcal{X})$. First, a pixel point $d_0$ is randomly selected from the high-resolution remote sensing image, and the position of $d_0$ may be denoted as a vector $(x_0, y_0)$. A square is randomly cropped from the image at the point $d_0$, to generate a random block $\mathcal{P}_0$. The side length of the random block $\mathcal{P}_0$ is denoted as $len(\mathcal{P}_0)$ The four vertices of the block $\mathcal{P}_0$ from the upper left corner to the lower right corner in a clockwise direction are $d_{01}$, $d_{02}$, $d_{03}$, and $d_{04}$ respectively:

$$d_{01}: \left(x_0 - \frac{1}{2}len(P_0), y_0 + \frac{1}{2}len(P_0)\right)$$

$$d_{02}: \left(x_0 + \frac{1}{2}len(P_0), y_0 + \frac{1}{2}len(P_0)\right)$$

$$d_{03}: \left(x_0 + \frac{1}{2}len(P_0), y_0 - \frac{1}{2}len(P_0)\right)$$

$$d_{04}: \left(x_0 - \frac{1}{2}len(P_0), y_0 - \frac{1}{2}len(P_0)\right)$$

To realize proliferation of random blocks from $\mathcal{P}_0$, four square images (generated based on the same rule as the random block $\mathcal{P}_0$) respectively centered at the four vertices $d_{01}$, $d_{02}$, $d_{03}$, and $d_{04}$ of the block $\mathcal{P}_0$ are randomly captured, to generate new random blocks $\mathcal{P}_i$, i=1, 2, 3, 4. Likewise, the four vertices of each newly generated random block are named as $d_{i1}$, $d_{i2}$, $d_{i3}$, $d_{i4}$, i=1, 2, 3, 4. The foregoing process is repeated for $\mathcal{N}$ times, till these captured random blocks $\mathcal{P}_i$ reach the edges of the image (if one of the random blocks reach an edge of the image, proliferation based on this random block is stopped), thus guaranteeing that the random blocks are spread all over the whole high-resolution remote sensing image $\mathcal{X}$.

After $\mathcal{N}$ proliferations ($\mathcal{N}$ is an integer), the total number of the random blocks reaches num $\mathcal{P}$ which is calculated as follows:

$$num_P = \begin{cases} 1 & N = 0 \\ 1 + \sum_{i=1}^{N} 4^N & N > 0 \end{cases}$$

In order that a combination of all the random blocks can cover all pixels of the remote sensing image, the side length of each random block is limited as follows:

The side length of each square is limited in a range of $512 \leq len(\cdot) \leq 1024$.

Step 102: Extract mono-spectral feature data in each band from each random block. The random block and its neighboring random blocks are all composed of multiple bands. Because specific ground objects have different sensitivities to different bands, it is required to perform extraction for these bands separately, to acquire multiple pieces of mono-spectral feature data from the random block and mono-spectral feature data from its neighboring random blocks. Multispectral feature data is extracted from the random block and its neighboring random blocks. Because the high-resolution remote sensing image is composed of multiple bands and specific ground objects have different sensitivities to the different bands, it is required to perform extraction for these bands separately. Generally, a remote sensing image is composed of four spectral bands, which are a blue band from 0.45 µm to 0.52 µm, a green band from 0.52 µm to 0.60 µm, a red band from 0.62 µm to 0.69 µm, and a near-infrared band from 0.76 µm to 0.96 µm. The remote sensing image is usually represented as four-channel mono-spectral feature data by a computer, and these several bands may be read directly by using the Geospatial Data Abstraction Library (GDAL) in python.

Step 103: Perform semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block.

Figure 3:
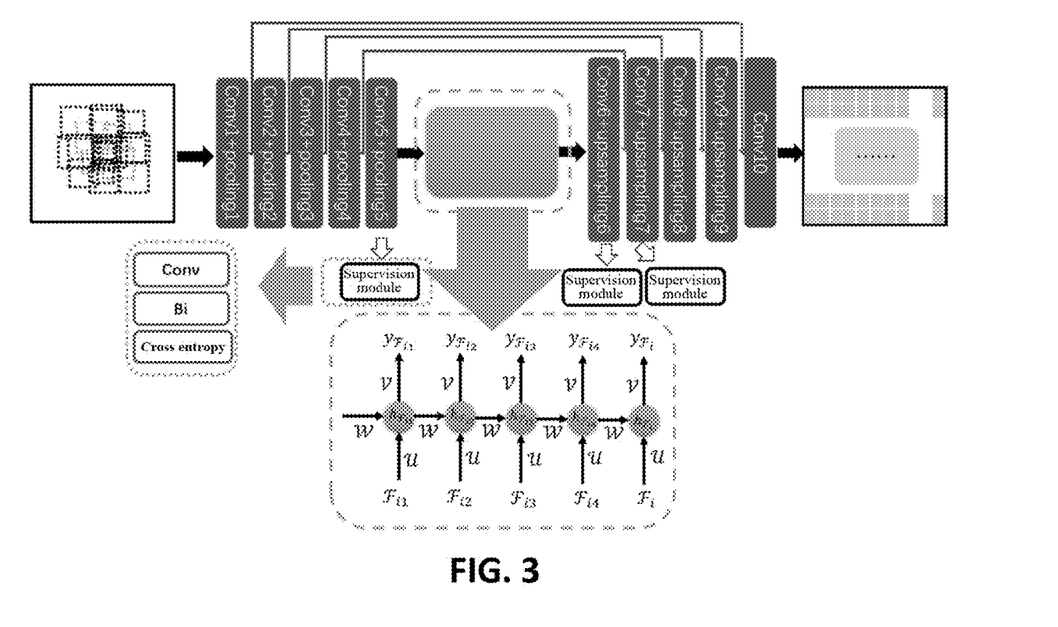
FIG. 3 is a schematic structural diagram of a supervised semantic segmentation network provided by the present disclosure.

As shown in FIG. 3, Cony denotes a convolutional layer, Pooling denotes downsampling by a pooling layer, upsampling denotes an upsampling layer, Bi denotes a bilinear interpolation operation, denotes $h\mathcal{F}_{im}$ an output of a feature map $\mathcal{F}_{im}$ at a hidden layer in the RNN network, $h\mathcal{F}_i$ denotes an output of a feature map $\mathcal{F}_i$ at the hidden layer in the RNN network, $y\mathcal{F}_{im}$ denotes an output of $h\mathcal{F}_{im}$, $y\mathcal{F}_i$ denotes an output of denote transposed matrices, $\mathcal{F}_i$ denotes an advanced abstract feature generated after a random block $\mathcal{P}_i$ is processed by an encoder En(·), and $\mathcal{F}_{im}$ denotes an advanced abstract feature generated after one neighboring random block $\mathcal{P}_{im}$ of the random block $\mathcal{P}_i$ is processed by the encoder En(·), where m is a subscript. As shown in FIG. 3, the supervised semantic segmentation network includes an encoder, an RNN network, a decoder, a first supervision module, a second supervision module, and a third supervision module. The encoder, the RNN network, and the decoder are successively connected. The first supervision module is arranged in the last layer of the encoder, the second supervision module is arranged in the first layer of the decoder, and the third supervision module is arranged in the second layer of the decoder.

The step 103 of performing semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block specifically includes the following process:

Abstract features are extracted from mono-spectral feature data in the jth bands of the ith random block $p_i$ and a random block $p_{im}$ neighboring the ith random block $p_i$ by using the encoder and according to a formula $$F_i^j = En(P_i^j)$$
$$F_{im}^j = En(P_{im}^j), m = 1, 2, 3, 4,$$

to obtain abstract feature maps regarding the jth bands of the ith random block $p_i$ and the random block $p_{im}$ neighboring the ith random block $p_i$, where $F_i^j$ denotes an abstract feature map regarding the jth band of the random block $p_i$, En(□), denotes the encoder, and $F_{im}^j$ denotes an abstract feature map regarding the jth band of the mth random block $p_{im}$ neighboring the random block $p_i$. Specifically, by using the random block $p_i$ as an image unit, the neighborhood of the random block $p_i$ covers four random blocks randomly captured at the four vertices $d_{i1}$, $d_{i2}$, $d_{i3}$, $d_{i4}$ of $\mathcal{P}_i$, which are denoted as $\mathcal{P}_{i1}$, $\mathcal{P}_{i2}$, $\mathcal{P}_{i3}$, $\mathcal{P}_{i4}$ herein for convenience. The four random blocks are nearest to the random block $p_i$, and there are overlapping image regions. Therefore, they are highly correlated in content. Based on a dependence relationship between images, semantic segmentation subnetworks can output semantic segmentation probability plots with the same size as an input image, for ease of fusion.

To achieve a semantic segmentation function, certain embodiments herein use a typical framework U-Net for semantic segmentation. First, advanced abstract features are extracted from the image by using the encoder.

Afterwards, $F_{im}^j$, (m=1, 2, 3, 4) and $F_i^j$ are sequentially input into the RNN network, to establish a dependence relationship between the four neighboring random blocks and the random block $p_i$. Based on the abstract feature maps regarding the jth bands of the ith random block $p_i$ and the random block $p_{im}$ neighboring the ith random block $p_i$, neighborhood association is established between abstract feature maps regarding the jth bands of the ith random block $p_i$ and four random blocks neighboring the ith random block $p_i$ via the RNN network and by using the formula $$h_{F_{im}^j} = \begin{cases} \phi(uF_{im}^j + b), & m = 1 \\ \phi\left(uF_{im}^j + wh_{F_{i(m-1)}^j} + b\right), & m = 2, 3, 4 \end{cases}$$

-continued $$h_{F_i^j} = \phi\left(uF_i^j + wh_{F_{i4}^j} + b\right)$$

$$y_{F_{im}^j} = \sigma\left(Vh_{F_{im}^j} + c\right)$$

$$y_{F_i^j} = \sigma\left(Vh_{F_i^j} + c\right),$$

to obtain abstract features of the jth band of the ith random block $p_i$ after the neighborhood association, where $h_{F_{im}^j}$, $h_{F_{i(m-1)}^j}$, and $h_{F_{i4}^j}$ respectively denote outputs of abstract feature maps $F_{im}^j$ regarding the jth bands of the mth random block $p_{im}$, the (m−1)th random block $p_{i(m-1)}$, and the fourth random block $p_{i4}$ which neighbor the ith random block $p_i$ at the hidden layer in the RNN network; $h_{F_i^j}$ denotes an output of the abstract feature map $F_i^j$ regarding the jth band of the ith random block $p_i$ at the hidden layer in the RNN network; $y_{F_{im}^j}$ abstract features of the jth band of the mth random block $p_{im}$ neighboring the ith random block $p_i$ after the neighborhood association; $y_{F_i^j}$ denotes the abstract features of the jth band of the ith random block $p_i$ after the neighborhood association; $\phi(\cdot)$ denotes a first nonlinear function and $\sigma(\cdot)$ denotes a second nonlinear function; u denotes a first transposed matrix, v denotes a second transposed matrix, and w denotes a third transposed matrix; and b denotes a first bias term and c denotes a second bias term. The abstract features of the jth band of the ith random block that are obtained after the neighborhood association are decoded with the decoder and by using a formula $p_i^j = \mathrm{De}(y_{F_i^j})$, to obtain a mono-spectral semantic segmentation probability plot $p_i^j$ regarding the jth band of the ith random block $p_i$.

Feature data output by the encoder, feature data output by the RNN network, and feature data output by the decoder are supervised respectively with the first, second, and third supervision modules. Specifically, in order to improve the performance of semantic segmentation, classification are made pixel by pixel and upsampling is performed subsequently by means of a bilinear interpolation to restore the image to the original size, which will be performed respectively in a convolutional layer in the last layer of the encoder, in the first layer of the decoder and in the second layer of the decoder; and finally, a cross-entropy loss function is used to evaluate the performance of the encoder, the RNN network, and the decoder, thus monitoring the network from these three aspects. The calculation equation is as follows:

$$y_{pre} = \mathcal{B}i(\mathrm{conv1}(\mathcal{A}))$$

$$\mathcal{L} = -\Sigma y_{true} \log y_{pre} + (1 - y_{true}) \log(1 - y_{pre})$$

where $y_{pre}$ denotes a predicted probability, which is a semantic segmentation probability plot, regarding output features $\mathcal{A}$ of a supervised layer after processing by the convolutional layer and a bilinear interpolation layer; conv1 (·) denotes a convolution for classification; $\mathcal{B}(\cdot)$ denotes a bilinear interpolation operation; and $\mathcal{L}$ denotes a loss difference between the predicated probability $y_{pre}$ calculated by using the cross-entropy loss function and a true label $y_{true}$.

Figure 4:
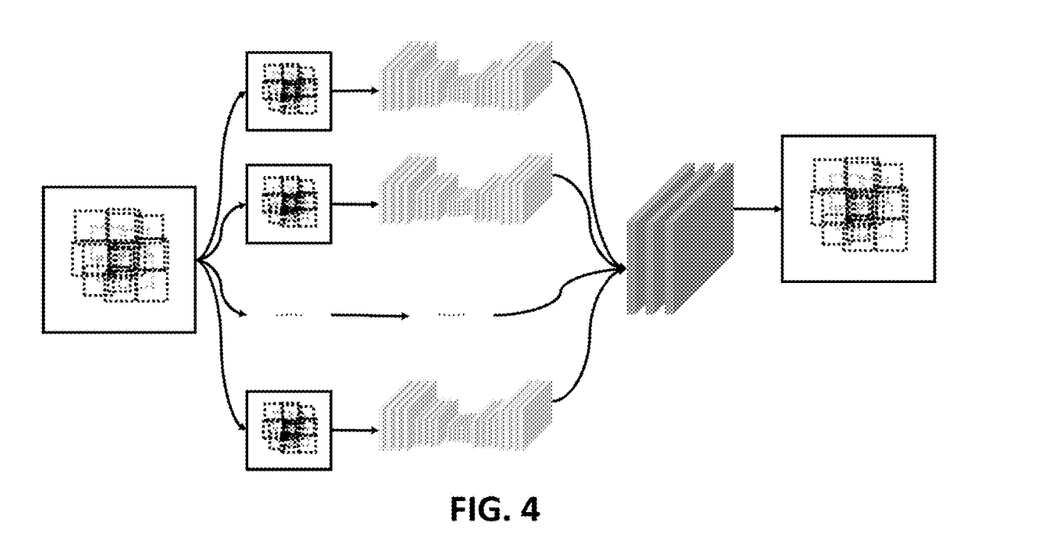
FIG. 4 is a schematic structural diagram of a weight training network provided by the present disclosure.

A weight training network is constructed for the plurality of mono-spectral semantic segmentation probability plots. As shown in FIG. 4, the weight training network includes a plurality of parallel supervised semantic segmentation networks and a convolution fusion module. In the mode of multiple parallel semantic segmentation subnetworks, the weight training network trains each semantic segmentation subnetwork separately by using the mono-spectral feature data of each random block and its neighboring random blocks, to obtain semantic segmentation probability plots of the mono-spectral feature data. Finally, the semantic segmentation probability plots of multiple pieces of mono-spectral data of the random blocks are fused by using a convolutional layer, to obtain a fused probability plot.

A spectral image with different spectrums shows different sensitivities to different ground objects, and therefore weight training can be performed according to an identified target. Specifically, based on the multiple pieces of mono-spectral feature data of the random block, weight training is performed on the mono-spectral semantic segmentation probability plot regarding each band by using the weight training network, to obtain a trained weight. By continuously inputting mono-spectral feature data of new random blocks and their neighboring random blocks, outputs from an input layer to the hidden layer and from the hidden layer to an output layer are calculated by means of forward propagation, and the network is optimized by means of back propagation, such that weight parameters in the weight training network are continuously updated till convergence.

Step 104: Fuse mono-spectral semantic segmentation probability plots regarding all bands of each random block by using a trained weight, to obtain a fused semantic segmentation probability plot of each random block.

After the mono-spectral feature data in each band of each random block is processed by the semantic segmentation subnetworks, a semantic segmentation probability plot $p_i^j$ is generated. These semantic segmentation probability plots are fused to obtain a fused semantic segmentation probability plot, which may be specifically expressed as follows:

$$\mathrm{out} = \mathrm{conv2}(p_i^1, \ldots, p_i^j), j = 1, 2, \ldots \max(j)$$

where out denotes the fused semantic segmentation probability plot, conv2 denotes an operation of using a convolutional layer for spectral fusion, and max (j) denotes the number of bands contained in the high-resolution remote sensing image.

Road information, bridge information, and the like to be detected are acquired according to the fused semantic segmentation probability plot from the high-resolution remote sensing image.

Certain embodiments herein further provide a semantic segmentation system for a high-resolution remote sensing image based on random blocks, where the semantic segmentation system includes the following modules:

An image partitioning module is configured to partition a high-resolution remote sensing image into a plurality of random blocks.

The image partitioning module specifically includes: a pixel point selection submodule, configured to randomly select a pixel point $d_0$ in a central area of the high-resolution remote sensing image; a first image partitioning submodule, configured to crop a square from the high-resolution remote sensing image to obtain a random block $p_0$, where the square is centered at the pixel point $d_0$ and has a randomly generated side length of $\mathrm{len}(p_0)$; a second image partitioning submodule, configured to further crop squares which are respectively centered at the four vertices $d_{01}, d_{02}, d_{03}$ and $d_{04}$ of the random block $p_0$ and have randomly generated side lengths $\mathrm{len}(p_{01}), \mathrm{len}(p_{02}), \mathrm{len}(p_{03}), \mathrm{len}(p_{04})$ from the high-resolution remote sensing image, to generate random blocks $p_{01}, p_{02}, p_{03}$, and $p_{04}$ which neighbor the random block $p_0$, where the side length of each square is in a range of $512 \leq \mathrm{len}(\cdot) \leq 1024$; and a third image partitioning submodule, configured to repeat the step of "further cropping squares which are respectively centered at the four vertices $d_{01}, d_{02}, d_{03}$ and $d_{04}$ of the random block $p_0$ and have randomly generated side lengths len($p_{o1}$), len($p_{o2}$), len($p_{o3}$), len($p_{o4}$) from the high-resolution remote sensing image, to generate random blocks $p_{o1}$, $p_{o2}$, $p_{o3}$, and $p_{o4}$ which neighbor the random block $p_o$", to continuously generate random blocks neighboring each newly generated random block until these newly generated random blocks all reach edges of the high-resolution remote sensing image.

A mono-spectral feature data extraction module is configured to extract mono-spectral feature data in each band from each random block.

A semantic segmentation module is configured to: perform semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block.

The supervised semantic segmentation network includes an encoder, an RNN network, a decoder, a first supervision module, a second supervision module, and a third supervision module. The encoder, the RNN network, and the decoder are successively connected. The first supervision module is arranged in the last layer of the encoder, the second supervision module is arranged in the first layer of the decoder, and the third supervision module is arranged in the second layer of the decoder.

The semantic segmentation module specifically includes: an encoding submodule, configured to extract abstract features from mono-spectral feature data in the jth bands of the ith random block $p_i$ and a random block $p_{im}$ neighboring the ith random block $p_i$ by using the encoder and according to a formula $$F_i^j = En(P_i^j)$$

$$F_{im}^j = En(P_{im}^j), m = 1, 2, 3, 4,$$

to obtain abstract feature maps regarding the jth bands of the ith random block $p_i$ and the random block $p_{im}$ neighboring the ith random block $p_i$, where $F_i^j$ denotes an abstract feature map regarding the jth band of the random block $p_i$, En($\square$) denotes the encoder, and $F_{im}^j$ denotes an abstract feature map regarding the jth band of the mth random block $p_{im}$ neighboring the random block $p_i$; a neighborhood feature association submodule, configured to: based on the abstract feature maps regarding the jth bands of the ith random block $p_i$ and the random block $p_{im}$ neighboring the ith random block $p_i$, establish neighborhood association between abstract feature maps regarding the jth bands of the ith random block $p_i$ and four random blocks neighboring the ith random block $p_i$ via the RNN network and by using the formula $$h_{F_{im}^j} = \begin{cases} \phi(uF_{im}^j + b), & m = 1 \\ \phi(uF_{im}^j + wh_{F_{i(m-1)}^j} + b), & m = 2, 3, 4 \end{cases}$$

$$h_{F_i^j} = \phi(uF_i^j + wh_{F_{i4}^j} + b)$$

$$y_{F_{im}^j} = \sigma(Vh_{F_{im}^j} + c)$$

$$y_{F_i^j} = \sigma(Vh_{F_i^j} + c),$$

to obtain abstract features of the jth band of the ith random block $p_i$ after the neighborhood association, where $h_{F_{im}^j}$, $h_{F_{i(m-1)}^j}$, and $h_{F_{i4}^j}$ respectively denote outputs of abstract feature maps $F_{im}^j$ regarding the jth bands of the mth random block $p_{im}$, the (m−1)th random block $p_{i(m-1)}$, and the fourth random block $p_{i4}$ which neighbor the ith random block $p_i$ at the hidden layer in the RNN network; $h_{F_i^j}$ denotes an output of the abstract feature map $F_i^j$ regarding the jth band of the ith random block $p_i$ at the hidden layer in the RNN network; $y_{F_{im}^j}$ abstract features of the jth band of the mth random block $p_{im}$ neighboring the ith random block $p_i$ after the neighborhood association; $y_{F_i^j}$ denotes the abstract features of the jth band of the ith random block $p_i$ after the neighborhood association; $\phi(\cdot)$ denotes a first nonlinear function and $\sigma(\cdot)$ denotes a second nonlinear function; u denotes a first transposed matrix, v denotes a second transposed matrix, and w denotes a third transposed matrix; and b denotes a first bias term and c denotes a second bias term; a decoding submodule, configured to decode, with the decoder and by using a formula $p_i^j = De(y_{F_i^j})$, the abstract features of the jth band of the ith random block that are obtained after the neighborhood association, to obtain a mono-spectral semantic segmentation probability plot $p_i^j$ regarding the jth band of the ith random block $p_i$; and a supervision submodule, configured to supervise feature data output by the encoder, feature data output by the RNN network, and feature data output by the decoder respectively with the first, second, and third supervision modules.

A fusion module is configured to fuse mono-spectral semantic segmentation probability plots regarding all bands of each random block by using a trained weight, to obtain a fused semantic segmentation probability plot of each random block.

The semantic segmentation system further includes: a weight training network construction module, configured to construct a weight training network for the plurality of mono-spectral semantic segmentation probability plots, where the weight training network includes a plurality of parallel supervised semantic segmentation networks and a convolution fusion module; and a weight training module, configured to: based on the multiple pieces of mono-spectral feature data of the random block, perform weight training on the mono-spectral semantic segmentation probability plot regarding each band by using the weight training network, to obtain the trained weight.

The technical solutions of certain embodiments herein achieve the following advantages: Because a high-resolution remote sensing image is multispectral and has a large data amount, certain embodiments herein partition the remote sensing image into a plurality of small sections by means of random blocks, and further achieves data enhancement. Moreover, the remote sensing image with different spectrums shows different sensitivities to different ground objects, and therefore, the convolutional layer used in certain embodiments herein are equivalent to subjecting a predicted image with different spectrums to weighted summation. Certain embodiments herein divide the high-resolution remote sensing image into random blocks, and performs semantic segmentation for each individual random block separately, thus avoiding overflow of GPU memory during semantic segmentation of the high-resolution remote sensing image. In addition, certain embodiments herein incorporate feature data in random blocks neighboring each random block in the process of semantic segmentation, overcoming the technical shortcoming that the existing segmentation method for the remote sensing image weakens the correlation within the image. Moreover, certain embodiments herein perform semantic segmentation separately on mono-spectral feature data in each band of the high-resolution remote sensing image, so that objects with the same or similar colors can be accurately identified according to the characteristic that different ground objects have different sensitivities to light with different spectrums, thus enhancing the accuracy of sematic segmentation of the high-resolution remote sensing image.

Each embodiment of the present specification is described in a progressive manner, each embodiment focuses on the difference from other embodiments, and identical or similar parts of the embodiments may be obtained with reference to each other.

The principles and implementations of the present disclosure have been described with reference to specific embodiments. The description of the above examples is only for facilitating understanding of the method and the core idea of the present disclosure, and the described embodiments are only a part of the embodiments of the present disclosure. All other embodiments obtained by a person of ordinary skill in the art based on the embodiments of the present disclosure without departing from the inventive scope are the scope of the present disclosure.

What is claimed is:

1. A semantic segmentation method for a high-resolution remote sensing image based on random blocks, comprising:
    partitioning a high-resolution remote sensing image into a plurality of random blocks;
    extracting mono-spectral feature data in each band from each random block;
    performing semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block; and
    fusing mono-spectral semantic segmentation probability plots regarding all bands of each random block by using a trained weight, to obtain a fused semantic segmentation probability plot of each random block.

2. The semantic segmentation method for a high-resolution remote sensing image based on random blocks according to claim 1, wherein the partitioning the high-resolution remote sensing image into random blocks, to obtain a plurality of random blocks specifically comprises:
    randomly selecting a pixel point $d_0$ in a central area of the high-resolution remote sensing image;
    cropping a square from the high-resolution remote sensing image to obtain a random block $p_0$, wherein the square is centered at the pixel point $d_0$ and has a randomly generated side length of $len(p_0)$;
    further cropping squares which are respectively centered at the four vertices $d_{01}$, $d_{02}$, $d_{03}$, and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$ and $p_{04}$ which neighbor the random block $p_0$, wherein the side length of each square is in a range of $512 \leq len(\cdot) \leq 1024$; and
    repeating the step of "further cropping squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$", to continuously generate random blocks neighboring each newly generated random block until these newly generated random blocks all reach edges of the high-resolution remote sensing image.

3. The semantic segmentation method for a high-resolution remote sensing image based on random blocks according to claim 1, wherein the supervised semantic segmentation network comprises an encoder, an RNN network, a decoder, a first supervision module, a second supervision module, and a third supervision module;
    the encoder, the RNN network, and the decoder are successively connected; and
    the first supervision module is arranged in the last layer of the encoder, the second supervision module is arranged in the first layer of the decoder, and the third supervision module is arranged in the second layer of the decoder.

4. The semantic segmentation method for a high-resolution remote sensing image based on random blocks according to claim 3, wherein the performing semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block specifically comprises:
    extracting abstract features from mono-spectral feature data in the jth bands of the ith random block $p_i$ and a random block $p_{im}$ neighboring the ith random block $p_i$ by using the encoder and according to a formula $$F_i^j = En(P_i^j)$$

$$F_{im}^j = En(P_{im}^j), m = 1, 2, 3, 4,$$

to obtain abstract feature maps regarding the jth bands of the ith random block $p_i$ and the random block $p_{im}$ neighboring the ith random block $p_i$, wherein $F_i^j$ denotes an abstract feature map regarding the jth band of the random block $p_i$, $En(\square)$ denotes the encoder, and $F_{im}^j$ denotes an abstract feature map regarding the jth band of the mth random block $p_{im}$ neighboring the random block $p_i$;
    based on the abstract feature maps regarding the jth bands of the ith random block $p_i$ and the random block $p_{im}$ neighboring the ith random block $p_i$, establishing neighborhood association between abstract feature maps regarding the jth bands of the ith random block $p_i$ and four random blocks neighboring the ith random block $p_i$ via the RNN network and by using the formula $$h_{F_{im}^j} = \begin{cases} \phi(uF_{im}^j + b), & m = 1 \\ \phi\left(uF_{im}^j + wh_{F_{i(m-1)}^j} + b\right), & m = 2, 3, 4 \end{cases}$$

$$h_{F_i^j} = \phi\left(uF_i^j + wh_{F_{i4}^j} + b\right)$$

-continued $$y_{F_{im}^j} = \sigma\left(Vh_{F_{im}^j} + c\right)$$

$$y_{F_i^j} = \sigma\left(Vh_{F_i^j} + c\right),$$

to obtain abstract features of the jth band of the ith random block $p_i$ after the neighborhood association, wherein, $h_{F_{im}^j}$, $h_{F_{i(m-1)}^j}$, and $h_{F_{i4}^j}$ respectively denote outputs of abstract feature maps $F_{im}^j$ regarding the jth bands of the mth random block $p_{im}$, the (m−1)th random block $p_{i(m-1)}$, and the fourth random block $p_{i4}$ which neighbor the ith random block $p_i$ at the hidden layer in the RNN network; $h_{F_i^j}$ denotes an output of the abstract feature map $F_i^j$ regarding the jth band of the ith random block $p_i$ at the hidden layer in the RNN network; $y_{F_{im}^j}$ abstract features of the jth band of the mth random block $p_{im}$ neighboring the ith random block $p_i$ after the neighborhood association; $y_{F_i^j}$ denotes the abstract features of the jth band of the ith random block $p_i$ after the neighborhood association; $\phi(\cdot)$ denotes a first nonlinear function and $\sigma(\cdot)$ denotes a second nonlinear function; u denotes a first transposed matrix, V denotes a second transposed matrix, and w denotes a third transposed matrix; and b denotes a first bias term and c denotes a second bias term;

decoding, with the decoder and by using a formula $p_i^j = De(y_{F_i^j})$, the abstract features of the jth band of the ith random block that are obtained after the neighborhood association, to obtain a mono-spectral semantic segmentation probability plot $p_i^j$ regarding the jth band of the ith random block $p_i$; and supervising feature data output by the encoder, feature data output by the RNN network, and feature data output by the decoder respectively with the first, second, and third supervision modules.

5. The semantic segmentation method for a high-resolution remote sensing image based on random blocks according to claim 1, wherein before the step of fusing mono-spectral semantic segmentation probability plots regarding all bands of each random block by using a trained weight, to obtain a fused semantic segmentation probability plot of each random block, the method further comprises:

constructing a weight training network for the plurality of mono-spectral semantic segmentation probability plots, wherein the weight training network comprises a plurality of parallel supervised semantic segmentation networks and a convolution fusion module; and based on the multiple pieces of mono-spectral feature data of the random block, performing weight training on the mono-spectral semantic segmentation probability plot regarding each band by using the weight training network, to obtain a trained weight.

6. A semantic segmentation system for a high-resolution remote sensing image based on random blocks, comprising:

an image partitioning module, configured to partition a high-resolution remote sensing image into a plurality of random blocks;

a mono-spectral feature data extraction module, configured to extract mono-spectral feature data in each band from each random block;

a semantic segmentation module, configured to: perform semantic segmentation separately on the mono-spectral feature data in each band of each random block by using a supervised semantic segmentation network and with reference to mono-spectral feature data in each band of random blocks neighboring each random block, to obtain a mono-spectral semantic segmentation probability plot regarding each band of each random block; and a fusion module, configured to fuse mono-spectral semantic segmentation probability plots regarding all bands of each random block by using a trained weight, to obtain a fused semantic segmentation probability plot of each random block.

7. The semantic segmentation system for a high-resolution remote sensing image based on random blocks according to claim 6, wherein the image partitioning module specifically comprises:

a pixel point selection submodule, configured to randomly select a pixel point $d_0$ in a central area of the high-resolution remote sensing image;

a first image partitioning submodule, configured to crop a square from the high-resolution remote sensing image to obtain a random block $p_0$, wherein the square is centered at the pixel point $d_0$ and has a randomly generated side length of $len(p_0)$;

a second image partitioning submodule, configured to further crop squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$, wherein the side length of each square is in a range of $512 \leq len(\cdot) \leq 1024$; and a third image partitioning submodule, configured to repeat the step of "further cropping squares which are respectively centered at the four vertices $d_{01}$, $d_{02}$, $d_{03}$ and $d_{04}$ of the random block $p_0$ and have randomly generated side lengths $len(p_{01})$, $len(p_{02})$, $len(p_{03})$, $len(p_{04})$ from the high-resolution remote sensing image, to generate random blocks $p_{01}$, $p_{02}$, $p_{03}$, and $p_{04}$ which neighbor the random block $p_0$", to continuously generate random blocks neighboring each newly generated random block until these newly generated random blocks all reach edges of the high-resolution remote sensing image.

8. The semantic segmentation system for a high-resolution remote sensing image based on random blocks according to claim 6, wherein the supervised semantic segmentation network comprises an encoder, an RNN network, a decoder, a first supervision module, a second supervision module, and a third supervision module;

the encoder, the RNN network, and the decoder are successively connected; and the first supervision module is arranged in the last layer of the encoder, the second supervision module is arranged in the first layer of the decoder, and the third supervision module is arranged in the second layer of the decoder.

9. The semantic segmentation system for a high-resolution remote sensing image based on random blocks according to claim 8, wherein the semantic segmentation module specifically comprises:

an encoding submodule, configured to extract abstract features from mono-spectral feature data in the jth bands of the ith random block $p_i$ and a random block $p_{im}$ neighboring the ith random block $p_i$ by using the encoder and according to a formula $$F_i^j = En(P_i^j)$$

$$F_{im}^j = En(P_{im}^j), m = 1, 2, 3, 4,$$

to obtain abstract feature maps regarding the jth bands of the ith random block $p_i$ and the random block $p_{im}$ neighboring the ith random block $p_i$, wherein $F_i^j$ denotes an abstract feature map regarding the jth band of the random block $p_i$, $En(\square)$ denotes the encoder, and $F_{im}^j$ denotes an abstract feature map regarding the jth band of the mth random block $p_{im}$ neighboring the random block $p_i$;

a neighborhood feature association submodule, configured to: based on the abstract feature maps regarding the jth bands of the ith random block $p_i$ and the random block $p_{im}$ neighboring the ith random block $p_i$, establish neighborhood association between abstract feature maps regarding the jth bands of the ith random block $p_i$ and four random blocks neighboring the ith random block $p_i$ via the RNN network and by using the formula $$h_{F_{im}^j} = \begin{cases} \phi(uF_{im}^j + b), & m = 1 \\ \phi\left(uF_{im}^j + wh_{F_{i(m-1)}^j} + b\right), & m = 2, 3, 4 \end{cases}$$

$$h_{F_i^j} = \phi\left(uF_i^j + wh_{F_{i4}^j} + b\right)$$

$$y_{F_{im}^j} = \sigma\left(Vh_{F_{im}^j} + c\right)$$

$$y_{F_i^j} = \sigma\left(Vh_{F_i^j} + c\right),$$

to obtain abstract features of the jth band of the ith random block $p_i$ after the neighborhood association, wherein $h_{F_{im}^j}$, $h_{F_{i(m-1)}^j}$, and $h_{F_{i4}^j}$ respectively denote outputs of abstract feature maps $F_{im}^j$ regarding the jth bands of the mth random block $p_{im}$, the (m−1)th random block $p_{i(m-1)}$, and the fourth random block $p_{i4}$ which neighbor the ith random block $p_i$ at the hidden layer in the RNN network; $h_{F_i^j}$ denotes an output of the abstract feature map $F_i^j$ regarding the jth band of the ith random block $p_i$ at the hidden layer in the RNN network; $y_{F_{im}^j}$ denotes abstract features of the jth band of the mth random block $p_{im}$ neighboring the ith random block $p_i$ after the neighborhood association; $y_{F_i^j}$ denotes the abstract features of the jth band of the ith random block $p_i$ after the neighborhood association; $\phi(\cdot)$ denotes a first nonlinear function and $\sigma(\cdot)$ denotes a second nonlinear function; u denotes a first transposed matrix, V denotes a second transposed matrix, and w denotes a third transposed matrix; and b denotes a first bias term and c denotes a second bias term;

a decoding submodule, configured to decode, with the decoder and by using a formula $p_i^j = De(y_{F_i^j})$, the abstract features of the jth band of the ith random block that are obtained after the neighborhood association, to obtain a mono-spectral semantic segmentation probability plot $p_i^j$ regarding the jth band of the ith random block $p_i$; and a supervision submodule, configured to supervise feature data output by the encoder, feature data output by the RNN network, and feature data output by the decoder respectively with the first, second, and third supervision modules.

10. The semantic segmentation system for a high-resolution remote sensing image based on random blocks according to claim 6, further comprising:

a weight training network construction module, configured to construct a weight training network for the plurality of mono-spectral semantic segmentation probability plots, wherein the weight training network comprises a plurality of parallel supervised semantic segmentation networks and a convolution fusion module; and a weight training module, configured to: based on the multiple pieces of mono-spectral feature data of the random block, perform weight training on the mono-spectral semantic segmentation probability plot regarding each band by using the weight training network, to obtain the trained weight.

* * * * *